W. P. HANSEN.
SPRING CLUTCH.
APPLICATION FILED MAY 17, 1912.
1,055,905.
Patented Mar. 11, 1913.
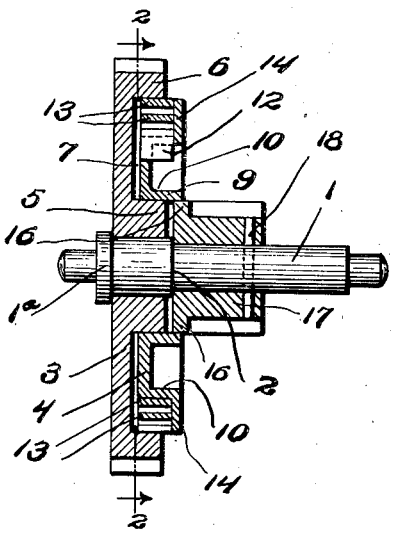
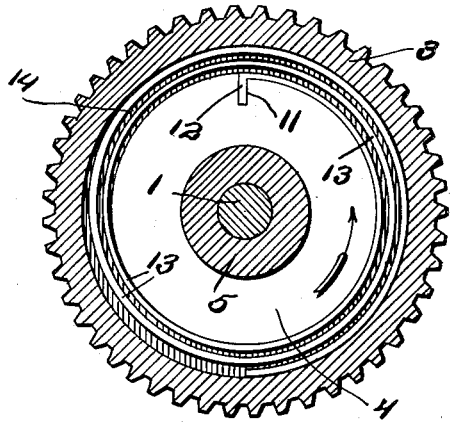
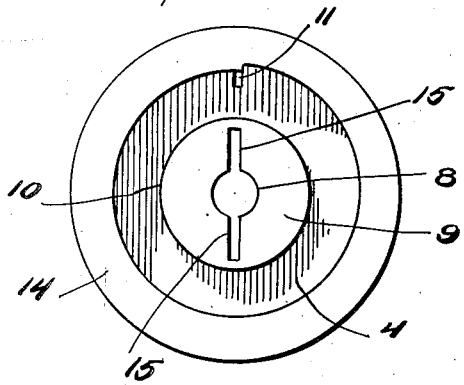
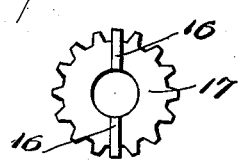
Witnesses
H. Strauss
R. N. Krenkel.
Inventor
William P. Hansen
By Joshua R. H. Potts
Attorney

UNITED STATES PATENT OFFICE.

WILLIAM PETER HANSEN, OF CAMDEN, NEW JERSEY, ASSIGNOR TO SPRING MOTOR FAN COMPANY, OF PHILADELPHIA, PENNSYLVANIA.

SPRING-CLUTCH.

1,055,905. Specification of Letters Patent. Patented Mar. 11, 1913.

Application filed May 17, 1912. Serial No. 697,867.

*To all whom it may concern:*

Be it known that I, WILLIAM P. HANSEN, a citizen of the United States, residing at Camden, in the county of Camden and State of New Jersey, have invented certain new and useful Improvements in Spring-Clutches, of which the following is a specification.

My invention relates to improvements in spring clutches, the object of the invention being to provide an improved device which dispenses with the necessity for ratchet wheel and pawl, and prevents any noise when one part moves relative to the other.

A further object is to provide a device of this kind which may be used at any point in a power transmission, so as to enable either member to move in one direction noiselessly without moving the other, but when moved in the opposite direction, compel the members to turn together.

With these and other objects in view, the invention consists in certain novel features of construction and combinations and arrangements of parts, as will be more fully hereinafter described and pointed out in the claims.

In the accompanying drawings: Figure 1, is a view in longitudinal section illustrating my improvements. Fig. 2, is a view in section on the line 2—2 of Fig. 1. Fig. 3, is a view in elevation of the rotary member 4, and Fig. 4, is a view of the pinion 17.

1, represents a shaft or arbor which is preferably of two diameters forming an annular shoulder 2 at the juncture of the two diameters, and on the larger diameter, one member 3 of my improved clutch is mounted to turn. This member 3 is provided on its periphery with gear teeth, so that it constitutes a gear wheel, and has a central opening of a size to fit the larger diameter of the shaft 1, and bear against an annular flange 1ª on said shaft. This member 3 is provided at one side with a circular hub portion 5, and at its periphery with a circular flange 6, and while I give this flange a separate reference character, it merely constitutes an extended surface of the gear wheel, so that an annular space 7 is provided in one face of the member 3 to receive the other member 4.

The member 4 is preferably stamped from sheet metal, and is made with a central opening 8 to receive the smaller diameter of shaft 1, and the metal of said member is forced inwardly to form a circular bearing 9 to turn around the hub portion 5 of member 3, and also project the intermediate portion of said member 4 inwardly. The outer face of the inwardly projecting circular portion 10 of said member 4 is provided with a recess 11 to receive the bent end 12 of a band spring 13. This band spring is coiled around the circular portion 10, and at its outer face bears against the inner face of flange 6, while the member 4 is extended annularly as shown at 14 to confine the spring inside of member 3. I call attention particularly to the periphery of the extension 10, because this extension is not a perfect circle on its periphery, but is somewhat cam shape so as to allow the convolutions of the coiled spring to wrap tightly one upon the other without presenting any sharp edge to the spring. The circular bearing portion 9 of member 4 is made with radial slots 15 into which webs 16 on the end of a pinion 17 project. This pinion 17 fits the smaller diameter of shaft 1, and is locked thereto in any suitable way, a pin 18 being shown for the purpose. As the webs 16 project into the slots 15 of member 4, this member 4 and pinion 17 must always turn together, while member 3 is loose upon shaft 1, and is locked to member 2 only by means of the spring 13 as will now be explained.

While, of course, the transmission may be from the member 3 to member 4, and the operation be the same, I shall describe the operation in the reverse manner. We will assume that shaft 1 is driven. This will cause pinion 17 and member 4 to revolve. If they are revolving in the direction of the arrow shown in Fig. 2, the spring will slide within the member 3 noiselessly, and without moving the member 3, if such member has any resistance whatever. If shaft 1, pinion 17, and member 4 are turned in the opposite direction, the spring 13 will be expanded and firmly grip the inner surface of flange 6, securely locking the members 3 and 4, so that they turn together as one fixed part.

It will be seen that my improved friction clutch takes the place of a ratchet and pawl, and may be utilized in any place where a ratchet and pawl can be used. Its greatest advantage over the ratchet and pawl is that it is noiseless, and the members may be moved oppositely or together in accordance with the mechanism with which the device is employed.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A spring clutch comprising two circular members, one located within the other, and a convolute spring wound around between said members and connected to one of said members, substantially as described.

2. A spring clutch comprising a circular member, a second circular member around the first-mentioned member and spaced therefrom, a convolute band spring wound around said inner member, and secured at one end to one of said members, substantially as described.

3. A spring clutch comprising a circular member, a second circular member around the first-mentioned member and spaced therefrom, a convolute band spring wound around said inner member having a bent end, a notch in one of said members, and the bent end of said spring positioned in said member, substantially as described.

4. A spring clutch comprising a circular member, a second circular member around the first-mentioned member and spaced therefrom, a convolute band spring wound around said inner member having a bent end said inner member having a recess in its periphery to receive the bent end of said spring, substantially as described.

5. A spring clutch comprising a circular member, a second circular member around the first-mentioned member and spaced therefrom, a band spring wound around said inner member having a bent end, said inner member having a recess in its periphery to receive the bent end of said spring, and the outer surface of said inner member being of spiral shape whereby a shoulder is formed at the recess, equal to the thickness of the spring, substantially as described.

6. A spring clutch comprising a shaft, a member mounted loosely on said shaft and constituting a gear wheel, a circular flange on one face of said member, a second circular member mounted on said shaft and of smaller diameter than the internal diameter of said flange, a spring wound around said inner member and bearing against the outer member, said spring secured at one end to the inner member, and a pinion fixed to the shaft and secured to turn with said last-mentioned member, substantially as described.

7. A spring clutch comprising a shaft, a member mounted loosely on said shaft and constituting a gear wheel, a circular flange on one face of said member, a second circular member mounted on said shaft and of smaller diameter than the internal diameter of said flange, a spring wound around said inner member and bearing against the outer member, said spring secured at one end to the inner member, said last-mentioned member having slots therein, a pinion fixed to the shaft, and webs on the pinion projecting into the slots in the said member, whereby the pinion, shaft and last-mentioned member are locked to turn together, substantially as described.

In testimony whereof I have signed my name to this specification in the presence of two subscribing witnesses.

WILLIAM PETER HANSEN.

Witnesses:
R. H. KRENKEL,
CHARLES E. POTTS.